(12) United States Patent
Sharma

(10) Patent No.: US 8,248,052 B2
(45) Date of Patent: Aug. 21, 2012

(54) CURRENT LIMIT SCHEME FOR DC-DC CONVERTERS

(75) Inventor: Yogesh Sharma, Santa Clarita, CA (US)

(73) Assignee: Analog Devices, Inc., Norwood, MA (US)

( * ) Notice: Subject to any disclaimer, the term of this patent is extended or adjusted under 35 U.S.C. 154(b) by 518 days.

(21) Appl. No.: 12/413,864

(22) Filed: Mar. 30, 2009

(65) Prior Publication Data

US 2010/0244572 A1    Sep. 30, 2010

(51) Int. Cl.
*G05F 1/575* (2006.01)
*G05F 1/618* (2006.01)

(52) U.S. Cl. ........................... 323/283; 323/284

(58) Field of Classification Search ............ 323/224, 323/282, 283, 284, 285
See application file for complete search history.

(56) References Cited

U.S. PATENT DOCUMENTS 7,595,615 B2 *  9/2009  Li et al. ................. 323/277
7,636,227 B2 * 12/2009  Cheng et al. ........... 361/93.1
7,902,800 B2 *  3/2011  Jain et al. ............... 323/224
7,940,030 B2 *  5/2011  Cannella et al. ........ 323/222

OTHER PUBLICATIONS

Analog Devices, Inc. ADP1610: 1.2 MHz DC-DC Step-Up Switching Converter, Data Sheet, Dated: Oct. 2004, available from http://www.analog.com/en/power-management/switching-regulators-integrated-fet-switches/ADP1610.., as retrieved on Jun. 4, 2009.
Analog Devices, Inc. ADP1621: Constant-Frequency, Current-Mode Step-Up DC-DC Controller, Data Sheet, Dated: Jan. 2007, available from http://www.analog,com/en/power-management/switching-controllers-external-switches/ADP1621/pr... as retrieved on Jun. 4, 2009.
Analog Devices, Inc. ADP1821: Step-Down DC-to-DC Controller, Data Sheet, Dated: Apr. 2007, available from http://www.analog,com/en/power-management/switching-controllers-external-switches/ADP1821/pr... as retrieved on Jun. 4, 2009.
Analog Devices, Inc. ADP1823: Dual, Interleaved, Step-Down DC-to-DC Controller with Tracking, Data Sheet, Dated: Oct. 2007, available from http://www.analog.com/en/power-management/switching-controllers-external-switches.ADP1823/pr.. as retrieved on Jun. 4, 2009.
Analog Devices, Inc. ADP1864: Constant Frequency Current-Mode Step-Down DC-to-DC Controller in TSOT, Data Sheet, Dated: Feb. 2007, available from http://www.analog.com/en/power-management/switching-controlllers-external-switches/ADP1864/pr... as retrieved on Jun. 4, 2009.

(Continued)

*Primary Examiner* — Gary L Laxton
(74) *Attorney, Agent, or Firm* — Koppel, Patrick, Heybl & Philpott

(57) ABSTRACT

A current limit scheme for current-mode DC-DC converters. The current limit scheme is used to limit the current through the inductor during a current limit event. Current flows through the inductor alternately from first and second power devices, with one of said devices operating in the on-state while the other is in the off-state. The current through the second power device is sensed and tracked if the peak inductor current exceeds a particular value. The inductor current is regulated by modulating the on-time of the first power device that delivers current from the input voltage source to the output through the inductor. Thus, the modulator adjusts the on-time of the first power device using past and present information related to the current flowing through the second power device and the instantaneous output voltage of the converter to limit the peak inductor current from exceeding a maximum value.

24 Claims, 3 Drawing Sheets

OTHER PUBLICATIONS

Analog Devices, Inc. ADP2105: 1 Amp Synchronous, Step-Down DC-to-DC Converter, Data Sheet, Dated: Sep. 2008, available at http://www.analog.com/en/power-management/switching-regualtors-integrated-fet-switches/ADP2105..as retrieved on Jun. 4, 2009.
Analog Devices, Inc. ADP2106: 1.5 Amp Synchronous, Step-Down DC-to-DC Converter, Data Sheet, Dated: Sep. 2008, available at http://www.analog.com/en/power-management/switching-regulators-integrated-fet-switches/ADP2106...as retrieved on Jun. 4, 2009.
Analog Devices, Inc. ADP2107: 2 Amp Synchronous, Step-Down DC-to-DC Converter, Data Sheet, Dated: Sep. 2008, available at http://www.analog.com/en/power-management/switching-regualtors-integrated-fet-switches/ADP2107..as retrieved on Jun. 4, 2009.

* cited by examiner

US 8,248,052 B2

CURRENT LIMIT SCHEME FOR DC-DC CONVERTERS

BACKGROUND OF THE INVENTION

1. Field of the Invention

Embodiments of the invention relate to DC-DC converters and, more particularly, to current limit schemes for such converters.

2. Description of the Related Art

DC-DC converters are a class of power converter. They are used to convert a direct current (DC) signal from one voltage level to another. These converters are commonly used in portable electronic devices that are powered by batteries, such as laptops and cellular phones. DC-DC converters are particularly useful in applications that have several different sub-systems, requiring several different voltage input levels.

There are several different schemes for DC-DC conversion. Linear regulators convert an input voltage to a lower output voltage by dissipating power through thermal radiation. For larger voltage drop high-current applications, these devices are inefficient and, thus, rarely used. A more commonly used scheme is switched-mode conversion. Switch-mode converters convert voltages by periodically storing energy in inductive and/or capacitive components and then releasing that energy to produce the desired voltage level. Inductive components store energy in the form of a magnetic field; whereas, capacitive components store energy in an electric field.

DC-DC converters that use a magnetic energy storage mechanism comprise inductors or transformers. The output voltage is controlled by modulating the duty cycle of the voltages used to charge the inductive component. One common type of magnetic storage DC-DC converter is the buck converter which is a well-known step-down converter, meaning that the regulated output voltage is always less than the input voltage.

FIG. 1a and FIG. 1b are circuit diagrams of a typical buck converter 100. Energy is periodically stored in an inductor L and then released to the load. During each periodic cycle, two switches $SW_H$ and $SW_L$ are used to alternately connect one end of inductor L to input source $V_{IN}$ during the charge phase and to ground during the discharge phase. When the high side switch $SW_H$ is closed (shown in FIG. 1a), current through the inductor L ($I_L$) rises linearly, charging the inductor L. Then $SW_H$ is opened and the low side switch $SW_L$ is closed (shown in FIG. 1b), and $I_L$ decreases linearly, discharging the inductor into the load. As the inductor L is discharging, $I_L$ decreases but still flows in the same direction into the load because the stored magnetic energy prevents the current through the inductor from changing direction instantaneously. The switches are turned on and off periodically at a fixed frequency such that the duty cycle determines the ratio of output voltage to input voltage.

One challenge associated with buck converters is protecting the circuit in a current-limit event, such as a short circuit at the output. If the output voltage $V_{OUT}$ suddenly goes to zero, $I_L$ will rise rapidly and eventually saturate the inductor L. Prolonged saturation will damage the circuits. Several known schemes have been employed to detect a current limit event and protect the system from runaway current damage by limiting the current through the inductor.

In order to detect a current limit event, the current through the inductor must be sensed. Sensing can be done across the inductor itself; however, this requires external components and a current sensing amplifier with a wide common mode range. The inductor current can also be sensed through the high side switch. This is problematic though, because this scheme also requires a current sensing amplifier with a high common mode range as well as a long settling time, resulting in a restrictive minimum on-time. Finally, the inductor current may be sensed through the low side switch during the discharge phase. Such a scheme is embodied in products manufactured by Analog Devices, such as ADP2114 and ADP1877.

SUMMARY OF THE INVENTION

A current-mode DC-DC converter according to an embodiment of the present invention comprises the following elements. A DC-DC converter circuit includes a first power device switchable between an on-state and an off-state and a second power device switchable between an on-state and an off-state. A current sensor is connected to sense a current through the second power device. A tracking element is connected to track the number of cycles in which the second power device current exceeds a current limit value. A modulator is connected to modulate the first power device based on information from the tracking element.

An electronic system that provides an output signal in response to an input signal according to an embodiment of the present invention comprises the following elements. The output signal is measured across a load circuit. A DC-DC converter circuit is included which comprises several elements: a first power device that can operate in an on-state and an off-state; a second power device that can operate in an on-state and an off-state; an inductor connected serially between the two power devices and the load circuit; and a capacitor connected in parallel with the load circuit. A current sensor is connected to sense current through the second power device. A tracking element is connected to increment a count value for each cycle in which the current through the second power device exceeds a current limit value and decrement the count value for every cycle in which the current does not exceed the current limit value. A modulator is connected to modulate the time that the first power device is in the on-state during a given cycle based on information from the tracking element such that the time that the first power device is in the on-state is inversely related to the count value. The first power device is switched to the off-state for an entire cycle when the count value reaches a maximum count value.

In another embodiment, the time that the first power device operates in the on-state during a given cycle is reduced in a subsequent cycle if a current through the second power device exceeds a current limit value during the given cycle. The first power device is switched to the off-state for an entire cycle when a count value, at least partially based on the number of previous cycles in which the current limit value is exceeded, reaches a maximum value.

These and other features, aspects and advantages of the present invention will become better understood with reference to the following description and claims.

DETAILED DESCRIPTION OF THE INVENTION

Figure 1A:
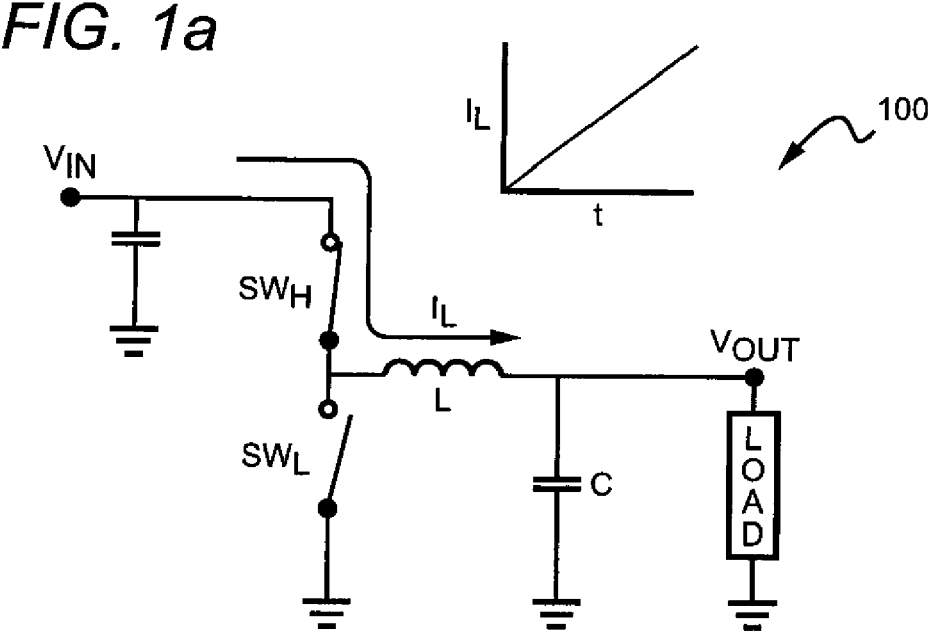
FIG. 1a is a circuit diagram of a buck converter that is known in the art with the high side power device operating in the on-state.
Figure 1B:
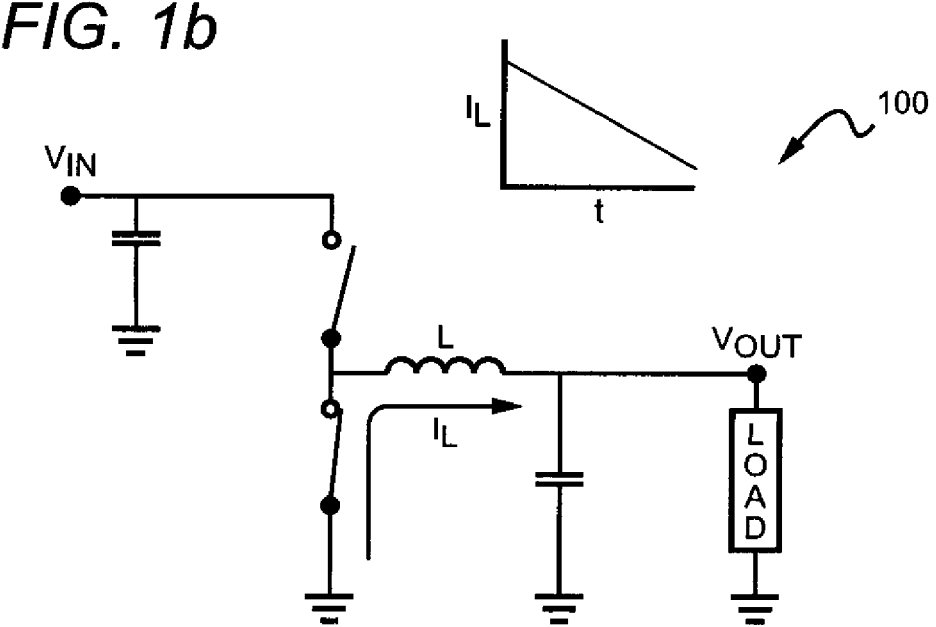
FIG. 1b is a circuit diagram of a buck converter that is known in the art with the low side power device operating in the on-state.

Embodiments of the present invention provide a current mode DC-DC converter that utilizes an improved current limit scheme. The current limit scheme can be used in step-down DC-DC converters, such as buck converters or forward converters, for example. As discussed above with reference to FIGS. 1a and 1b, this class of DC-DC converter includes an inductor (L). The current limit scheme is used to limit the current through the inductor L. Current flows through the inductor L alternately from first and second power devices, with one of said devices operating in the on-state while the other of the devices is in the off-state. The current through the inductor L is regulated by modulating the on-time of the first power device that delivers current from the input to the load through the inductor L. The modulator adjusts the on-time of the first power device using past and present information related to the current flowing through the second power device (sensed when the first power device is in the off-state) and the instantaneous output voltage of the converter. The present invention as embodied in the claims is discussed below in detail with reference to exemplary circuits and methods that implement this current limit scheme.

Figure 2:
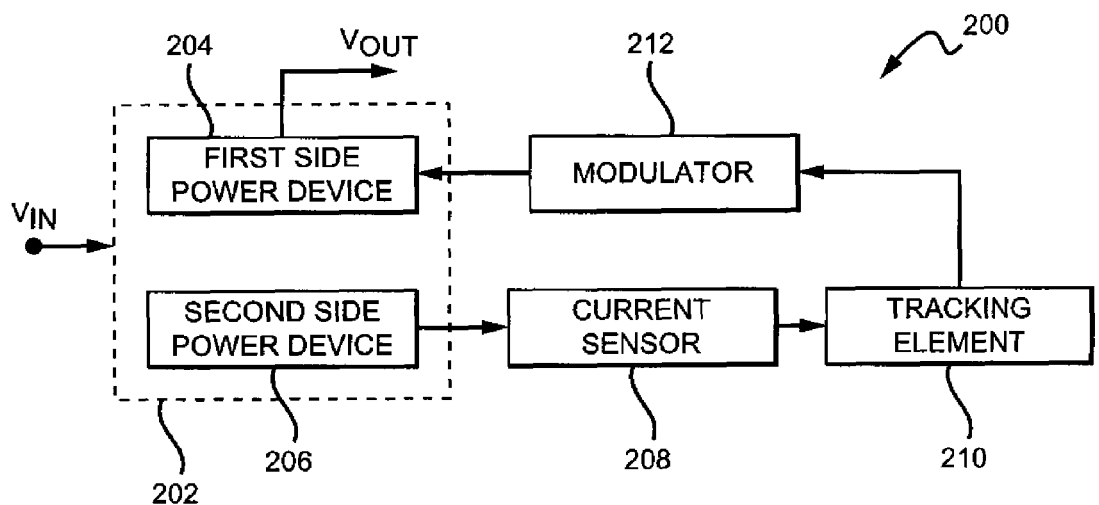
FIG. 2 is a block diagram of a current-mode DC-DC converter according to an embodiment of the present invention.

FIG. 2 shows a block diagram of a current-mode DC-DC converter 200 according to an embodiment of the present invention. An input voltage $V_{IN}$ is fed into a DC-DC converter circuit 202 which comprises first and second power devices 204, 206 that are switchable between an on-state and an off-state. A current sensor 208 monitors the current flowing through the second power device 206 and feeds that information to a tracking element 210. The tracking element 210 stores present and past information related to the current levels in the second power device 206. For example, in one embodiment, the tracking element 210 tracks the differential between the number of cycles in which the current through the second power device 206 exceeds a particular maximum value and the number of cycles in which this current does not exceed the maximum value. This information is then sent to a modulator 212. The modulator 212 adjusts the on-time during a given cycle (i.e. the duty cycle) of the first power device 204 so that the inductor current does not exceed a maximum value for an extended period of time. Thus, past and present information related to the current through the second power device 206 is used to modulate the on-time of the first power device to avoid harmful current levels during, for example, a short circuit event at the converter output.

Figure 3:
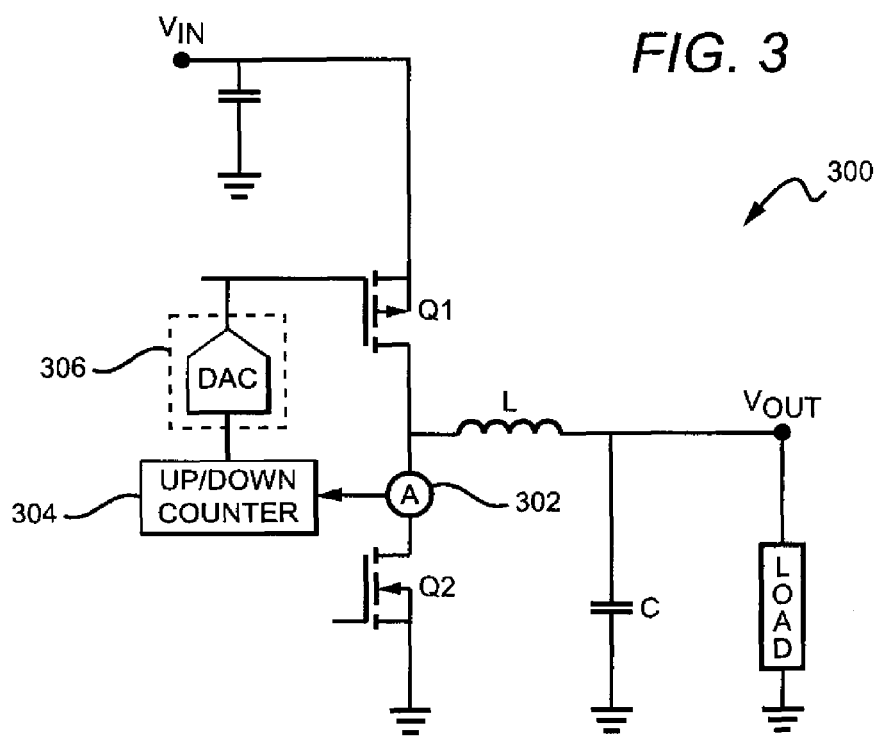
FIG. 3 is a circuit diagram of a step-down DC-DC converter according to an embodiment of the invention.

FIG. 3 shows a step-down DC-DC converter 300 according to an embodiment of the invention. FIG. 3 is meant to convey one embodiment of the general system of FIG. 2 that is capable of functioning according to the disclosed current limit scheme. Thus, the discussion below details the operation of the current-mode DC-DC converter 200 with reference to one possible exemplary embodiment. It is understood that other embodiments according to the claims are possible.

In the embodiment shown in FIG. 3, first and second power devices comprise large switching transistors Q1, Q2, which may be enhancement mode MOSFETs, as shown. The first power device Q1 is a PMOS transistor. The second power device Q2 is an NMOS transistor that functions as a synchronous rectifier, allowing the converter to operate in continuous conduction mode. A control signal is applied to the respective gates of the power devices Q1, Q2 to switch them between the on-state and the off-state. When Q1 is in the on-state current will flow between the drain and the source, likewise with Q2. In the off-state the power devices do not conduct significant current. The power devices Q1, Q2 operate in complimentary fashion, such that when Q1 is in the on-state, Q2 is in the off-state and vice versa. For purposes of this discussion, $t_{on}$ represents the time during a cycle when Q1 is in the on-state (Q2 is off), and $t_{off}$ represents the time during a cycle when Q1 is in the off-state (Q2 is on).

A voltage source $V_{IN}$ is connected to the source of Q1. During the first part of a cycle, Q1 is switched to the on-state and current flows through Q1 into the inductor L. The current through L will increase according to:

$$\Delta I_L = [(V_{IN} - V_{OUT})/L] * t_{on} \qquad \text{Eq.1}$$

where L is the inductor value and $t_{on}$ is the time that Q1 is in the on-state during a given cycle. Then during the second part of the cycle, Q1 is switched off for time $t_{off}$, Q2 is switched on, and current will flow through Q2 and inductor L according to:

$$\Delta I_L = -(V_{OUT}/L) * t_{off} \qquad \text{Eq.2}$$

Because current through an inductor cannot change instantaneously, initially current will still flow through L in the same direction, into the load, but the amount of current through L will be decreasing.

During a current limit event, e.g., a short-circuit at the output, the current through L will increase rapidly and may exceed the saturation current for inductor L during the cycle. A temporary current above the maximum level is acceptable; however prolonged exposure to the excessive current will saturate the inductor. To protect the inductor L and other sensitive circuit elements from runaway current, $t_{on}$ must be decreased in the subsequent cycle so that the increasing inductor current does not remain at saturation levels; in other words, $t_{on}$ must be modulated cycle by cycle to regulate the inductor current level below the current limit value. The information that determines $t_{on}$ is gathered at the second power device Q2 with current sensor 302.

The current through Q2 during the $t_{off}$ portion of the cycle is measured by the current sensor 302. Any device that measures current may be used. In one embodiment, the current sensor 302 comprises a comparator that measures the voltage across a resistance. The comparator compares this voltage with a reference voltage, and if the reference voltage is exceeded, the comparator outputs a signal indicating that the maximum inductor current has been exceeded during the cycle. The comparator output is fed into the tracking element 304.

The tracking element 304 tracks each cycle in which the current sensor indicates that the maximum inductor current has been exceeded. The tracking element 304 may comprise a simple up/down counter as shown in FIG. 3. If the tracking element 304 receives a signal from the current sensor 302 indicating that that maximum inductor current has been exceeded during the cycle, then the tracking element 304 increments a count. If the maximum inductor current during the cycle is not exceeded, then the tracking element 304 decrements the count. Thus, in this particular embodiment, the tracking element 304 measures the differential between the number of cycles in which the second power device current exceeds a limit and the number of cycles in which the limit is not exceeded. By maintaining a running count, the tracking element 304 presents real-time information to the modulator 306 based on data from present and past cycles.

The tracking element 304 may be implemented using various circuits. One acceptable configuration comprises a simple 4-bit up/down counter circuit. Depending on the desired resolution, the counter could include more or fewer bits. In this particular embodiment the counter circuit does not wrap around when the maximum and minimum count values are reached. At these extrema, some of the differential information is lost. For example, when the count is at a minimum (e.g., zero), the count will remain at that value until the count is incremented. Because the counter will not decrement below zero, some of the differential information is lost; however, it is not important to retain the differential information when the count is at a minimum since the converter output is well-regulated in this state. Likewise, when the count reaches a maximum (e.g., 15 for a 4-bit counter), it will remain at that value until the count is decremented. Each time the system detects a maximum count value, the first power device is switched to the off-state for a period of time, usually at least one full cycle. Other types of tracking elements may also be used, so long as the device includes a memory mechanism that allows information from previous cycles to be stored and used by the modulator 306.

The modulator 306 receives information related to past and present cycles from the tracking element and adjusts $t_{on}$ for the subsequent cycle based on that information. For example, in one embodiment if the tracking element increments the count, indicating that the maximum inductor current was exceeded during the cycle, $t_{on}$ for the subsequent cycle is reduced. The modulator 306 will continue to reduce $t_{on}$ for subsequent cycles so long as the maximum inductor current continues to be exceeded. Likewise, the modulator will increase $t_{on}$ for each cycle when the inductor current is below the maximum value until the count value reaches zero. When the count value is zero, $t_{on}$ is equal to a nominal on-time value, and the converter output is well-regulated.

During a short-circuit event that lasts for an appreciable amount of time, there will be several consecutive cycles in which the inductor current exceeds the maximum value, and the tracking element will eventually increment up to a maximum count value (e.g., count=15 for a 4-bit counter). At this point, the converter circuit 300 goes into a safe mode, and the power device Q1 may be turned off for an entire cycle, for multiple cycles, or for some other set period of time. Because any short-circuit event is not an ideal short, meaning that there is no true zero-resistance path from the output to ground, the inductor current will eventually decrease back to an acceptable level while the converter circuit 300 is in safe mode.

Figure 4:
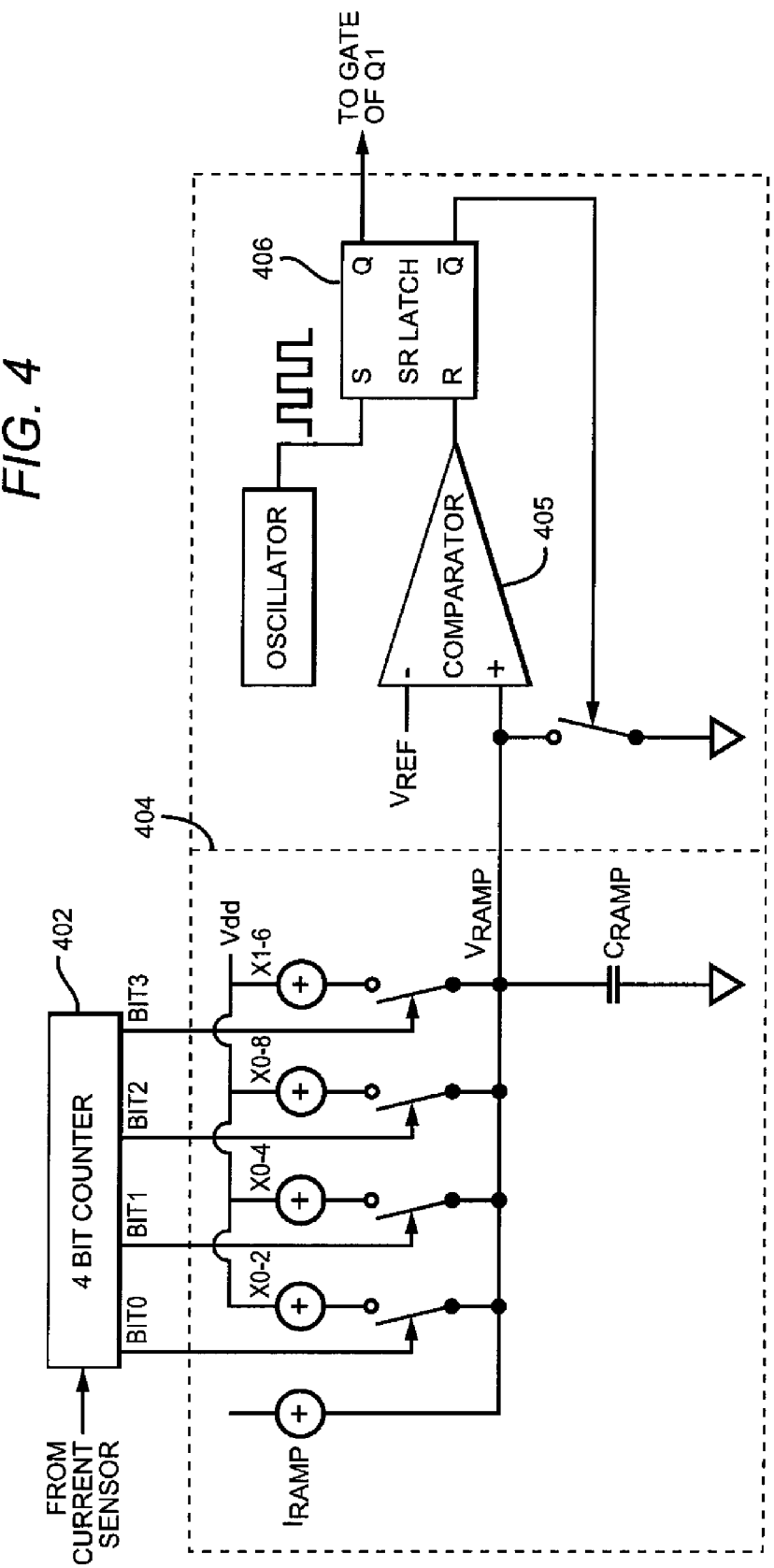
FIG. 4 is a circuit diagram of an implementation of a tracking element and a modulator according to an embodiment of the present invention.

The modulator 306 may be implemented using various topologies. FIG. 4 shows one acceptable configuration of a tracking element and a modulator according to an embodiment of the present invention. In this particular embodiment, the tracking element comprises a 4-bit up/down counter 402 and the modulator comprises a current DAC 404, a comparator 405 and some logic 406. As discussed above the counter 402 is connected to receive signal from the current sensor. The DAC 404 is connected to receive the digital output bits from the counter 402. The DAC 404 outputs a ramp signal that is compared to a reference voltage by comparator 405 to generate a logic signal that post digital processing drives the first power device (here, Q1).

This particular implementation of the modulator uses a binary current DAC scheme to convert the digital input to an analog current output. Each binary output of the counter 402 is connected to a switch in one of the current branches. A logic signal at one of the switches connects the corresponding current source to the output and adds that current to the total current that charges the ramp capacitor ($C_{RAMP}$). The switches corresponding to the bits from the least significant bit to the most significant bit are marked, respectively, x0.2, x0.4, x0.8 and x1.6. Each branch provides a multiple of $I_{RAMP}$ indicated by its multiplier value. For example, when connected the branch corresponding to bit0 outputs $0.2*I_{RAMP}$. This current is summed with the nominal $I_{RAMP}$ giving $0.2*I_{RAMP}+I_{RAMP}=1.2*I_{RAMP}$. Thus, after one current limit event (binary count value [0001]), the ramp current is stepped up from nominal $I_{RAMP}$ to $1.2*I_{RAMP}$. For each count increment, the ramp current is increased by $0.2*I_{RAMP}$. Another example: starting from count value zero, five consecutive cycles with a current limit event would yield a count of five (binary count value [0101]) and produce ramp current of $2.0*I_{RAMP}$. Using this scheme, when the counter 402 is at zero, the nominal current $I_{RAMP}$ is output to $C_{RAMP}$; when the counter is at maximum count value of 15, the current $4*I_{RAMP}$ is output to $C_{RAMP}$. Thus, a higher count value leads to a larger current charging $C_{RAMP}$.

The logic 406 in the modulator drives the power device Q1. One embodiment of the logic is a simple SR Latch. When the set input of the SR Latch goes high, the output Q of the SR Latch goes high. Even after the set input of the SR Latch goes low, the output Q will stay high until the reset input of the SR latch goes high. In the modulator, the set input of the SR Latch is driven by an oscillator running at a fixed frequency. Thus, every time the oscillator output goes high, the output Q of the SR Latch goes high, setting Q1 to its on-state. Also, the DAC 404 begins charging the $C_{RAMP}$ capacitor, and the $C_{RAMP}$ voltage ($V_{RAMP}$) starts to rise. $V_{RAMP}$ is compared to a reference voltage by comparator 405. When $V_{RAMP}$ exceeds the reference voltage, a signal is output by the comparator that resets the SR Latch, switching the first power device to the off-state. After Q1 is switched off, $C_{RAMP}$ is discharged. During this part of the cycle, power device Q2 is turned on and monitored for excessive inductor current, and the count value is adjusted accordingly. When the next oscillator pulse starts a new cycle, $C_{RAMP}$ is recharged with a new current that is determined by the count value. According to basic capacitor operation:

$$I=C(dV/dt) \qquad \text{Eq.3}$$

Referring to Eq.3, the slope of the ramp voltage (dV/dt) increases proportionally with ramp current. It follows that a larger current will charge $C_{RAMP}$ more quickly, resulting in the power device Q1 having a shorter on-time. In this way, the duty cycle of power device Q1 is controlled according to the running count value which reflects past and present current limit information from power device Q2.

Thus, embodiments of the present invention provide a current limit scheme for current-mode DC-DC converters as discussed above. The scheme allows for the use of past and present current limit information from the second power device to modulate the on-time of the first power device in the converter, limiting the peak current through the inductor to acceptable levels and self-correcting as necessary. Although the current limit scheme is discussed herein as applied to a current-mode step-down DC-DC converter, it is understood that the scheme can be applied to other DC-DC converter topologies as well, such as a forward converter, for example.

The embodiments of the invention described herein are exemplary. For example, it may be beneficial to use other types of circuits as tracking elements or modulators to achieve a particular functionality. Numerous modifications, variations and rearrangements can be readily envisioned to achieve substantially equivalent results, all of which are intended to be embraced within the spirit and scope of the invention as defined in the appended claims.

I claim:

1. A current-mode DC-DC converter, comprising:
   a DC-DC converter circuit comprising a high side first power device switchable between an on-state and an off-state and a low side second power device switchable between an on-state and an off-state;
   a current sensor connected to sense a current through said second power device;
   a tracking element connected to track the number of cycles in which said second power device current exceeds a current limit value; and
   a modulator connected to modulate said first power device based on information from said tracking element.

2. The current-mode DC-DC converter of claim 1, wherein the time that said first power device is in said on-state during a given cycle is modulated by said modulator.

3. The current-mode DC-DC converter of claim 1, said current sensor comprising a comparator that compares the current through said second power device with said current limit value and outputs a signal during each cycle in which said second power device current exceeds said current limit value.

4. The current-mode DC-DC converter of claim 3, said tracking element connected to receive said comparator signal indicating that said second power device current has exceeded said current limit value, said tracking element connected to temporarily store said information.

5. The current-mode DC-DC converter of claim 4, said tracking element comprising an up/down counter, said up/down counter incrementing a count value for each cycle in which said second power device current exceeds said current limit value and decrementing said count value for each cycle in which said second power device current does not exceed said current limit value.

6. The current-mode DC-DC converter of claim 5, wherein the time that said first power device is in the on-state during a given cycle is inversely related to said count value, such that as said count value increases the time that said first power device is in the on-state during a given cycle decreases and as the count value decreases the time that said first power device is in the on-state during a given cycle increases.

7. The current-mode DC-DC converter of claim 5, wherein said first power device is switched to the off-state for a period of time when said counter reaches a maximum count value.

8. The current-mode DC-DC converter of claim 5, wherein said first power device operates in the on-state for a nominal period of time during a given cycle when said counter is at a minimum value.

9. The current-mode DC-DC converter of claim 1, said modulator comprising a current digital-to-analog converter (DAC) connected to receive a signal from said tracking element, said current DAC arranged to provide an output signal that affects the time that said first power device is in the on-state during a given cycle.

10. The current-mode DC-DC converter of claim 1, wherein said DC-DC converter circuit is a step-down DC-DC converter circuit.

11. The current-mode DC-DC converter of claim 1, wherein said DC-DC converter circuit is a forward DC-DC converter circuit.

12. An electronic system that provides an output signal in response to an input signal, comprising:
    a load circuit wherein said output signal is measured across said load circuit;
    a DC-DC converter circuit, comprising:
      a first power device that can operate in an on-state and an off-state;
      a second power device that can operate in an on-state and an off-state;
      an inductor connected serially between said first and second side power devices and said load circuit; and
      a capacitor connected in parallel with said load circuit;
    a current sensor connected to sense current through said second power device;
    a tracking element connected to increment a count value for each cycle in which a current through said second power device exceeds a current limit value and decrement said count value for every cycle in which said current does not exceed said current limit value; and
    a modulator connected to modulate the time that said first power device is in the on-state during a given cycle based on information from said tracking element;
    wherein the time that said first power device is in the on-state is inversely related to said count value.

13. The DC-DC converter system of claim 12, said current sensor comprising a comparator that compares the current through said second power device with said current limit value and outputs a signal each time said second power device current exceeds said current limit value.

14. The DC-DC converter system of claim 12, wherein said first power device is switched to the off-state for a period of time when said counter reaches a maximum count value.

15. The DC-DC converter system of claim 12, wherein said first power device operates in the on-state for a nominal time during a given cycle when said counter is at a minimum value.

16. A DC-DC converter, comprising:
    a DC-DC converter circuit comprising a first power device switchable between and on-state and an off-state and a second power device switchable between an on-state and an off-state;
    wherein the time that said first power device operates in the on-state during a given cycle is reduced in a subsequent cycle if a current through said second power device exceeds a current limit value during said given cycle; and
    wherein said first power device is switched to the off-state for a period of time when a count value at least partially based on a number of previous cycles in which said current limit value is exceeded reaches a maximum value.

17. The DC-DC converter of claim 16, further comprising a current sensor connected to sense said second power device current.

18. The DC-DC converter of claim 17, said current sensor comprising a comparator that compares the current through said second power device with said current limit value and outputs a signal for each cycle in which said second power device current exceeds said current limit value.

19. The DC-DC converter of claim 16, wherein said count value is determined with a tracking element connected to track the differential between the number of cycles in which said second power device current exceeds said current limit value and the number of cycles in which said second power device current does not exceed said current limit.

20. The DC-DC converter of claim 19, said tracking element comprising an up/down counter circuit.

21. The DC-DC converter of claim 20, wherein said count value is incremented for each cycle in which said second power device current exceeds said current limit value and decremented for each cycle in which said second power device current does not exceed said current limit value.

22. The DC-DC converter of claim 16, further comprising a modulator circuit connected to modulate the time that said first power device operates in said on-state during a given cycle based on said count value.

23. A method for limiting inductor current in a DC-DC converter having a high side first power device and a low side second power device, comprising:
   sensing a current through said second power device;
   tracking a number of cycles in which said second power device current exceeds a current limit value;
   modulating the time that said first power device operates in the on-state during a given cycle based on information related to said number of cycles in which the second power device current exceeds said current limit value.

24. The method of claim 23, wherein said modulating comprises:
   reducing the time that said first power device operates in the on-state during a subsequent cycle when said second power device current exceeds said current limit value; and
   switching said first power device to the off-state for at least one subsequent cycle when a count value related to the number of previous cycles in which said current limit value was exceeded reaches a maximum count value.

* * * * *